July 31, 1962 R. L. BEYERSTEDT 3,047,307
TRACTOR STEERING ARRANGEMENT
Filed Aug. 4, 1960 3 Sheets-Sheet 3

INVENTOR
RALPH L. BEYERSTEDT
Paul O. Pippel
ATTORNEY 3,047,307
TRACTOR STEERING ARRANGEMENT
Ralph L. Beyerstedt, Libertyville, Ill., assignor to The
Frank G. Hough Co., a corporation of Illinois
Filed Aug. 4, 1960, Ser. No. 47,446
3 Claims. (Cl. 280—95)

This invention relates generally to motor vehicle steering systems, and more specifically to an improved steering arrangement for a tractor having steerable wheels on a rigid axle and carrier which oscillates relative to the body of the tractor.

Problems are often encountered in the art with the use of rigid oscillating axles for carrying the steerable wheels of a vehicle due to the often changing geometry of the steering links and levers when the axle oscillates relative to the body of the tractor. The changing geometry is particularly undesirable when the tractor is traveling in a straight ahead position at a substantial speed. Should one wheel ride over an obstruction, the steering geometry may be immediately changed to cause an automatic turning of the wheels. When this occurs the operator of the vehicle must constantly adjust his steering wheel in an attempt to overcome the wavering of the vehicle as the steerable wheels pass over bumps or obstructions.

It is the object of the present invention to provide a relatively simple mechanical steering arrangement for a tractor having a rigid axle with steerable wheels at each end thereof wherein the axle is connected to the body or frame of the tractor for oscillation about a longitudinal center line of the tractor.

It is a further object of the present invention to provide a certain steering link and lever geometry for the steerable wheels of a tractor wherein the steerable wheels are carried on a rigid axle which is secured to the body or frame of the tractor for oscillation about a longitudinal center axis of the tractor and wherein oscillations of the axle about the noted axis will not automatically change the steering geometry to produce unwanted steering when the tractor is traveling in a substantially straight line and when the wheels of the tractor pass over obstructions or bumps on the highway.

Other objects and features of the present invention will be apparent upon a perusal of the following specification and drawings of which:

The present embodiment is the preferred embodiment, but it is to be understood that changes can be made in the present embodiment by one skilled in the art without departing from the spirit and scope of the present invention.

Figure 1:
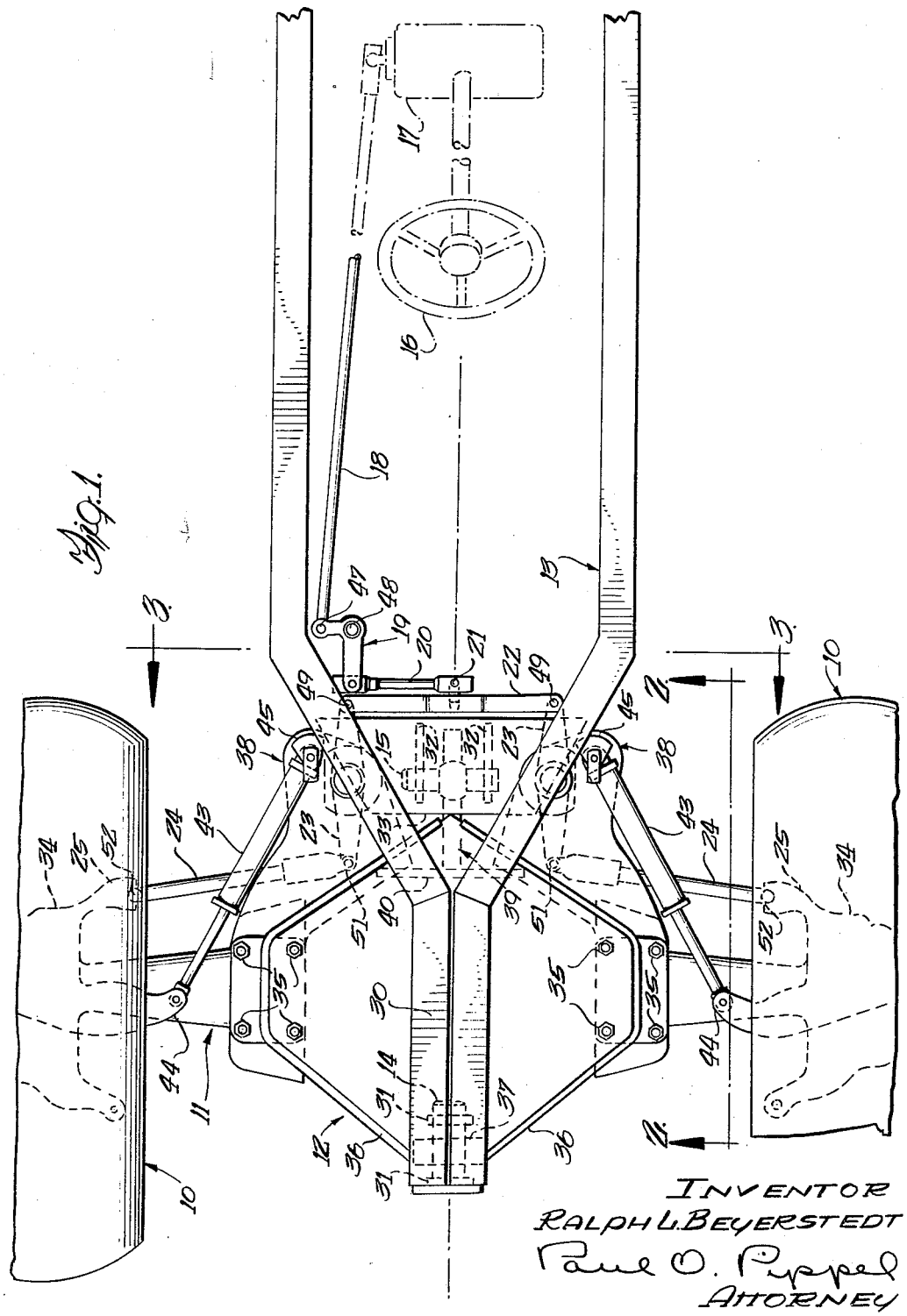
FIGURE 1 is a top plan view of a rearward portion of a tractor including the subject invention.
Figure 2:
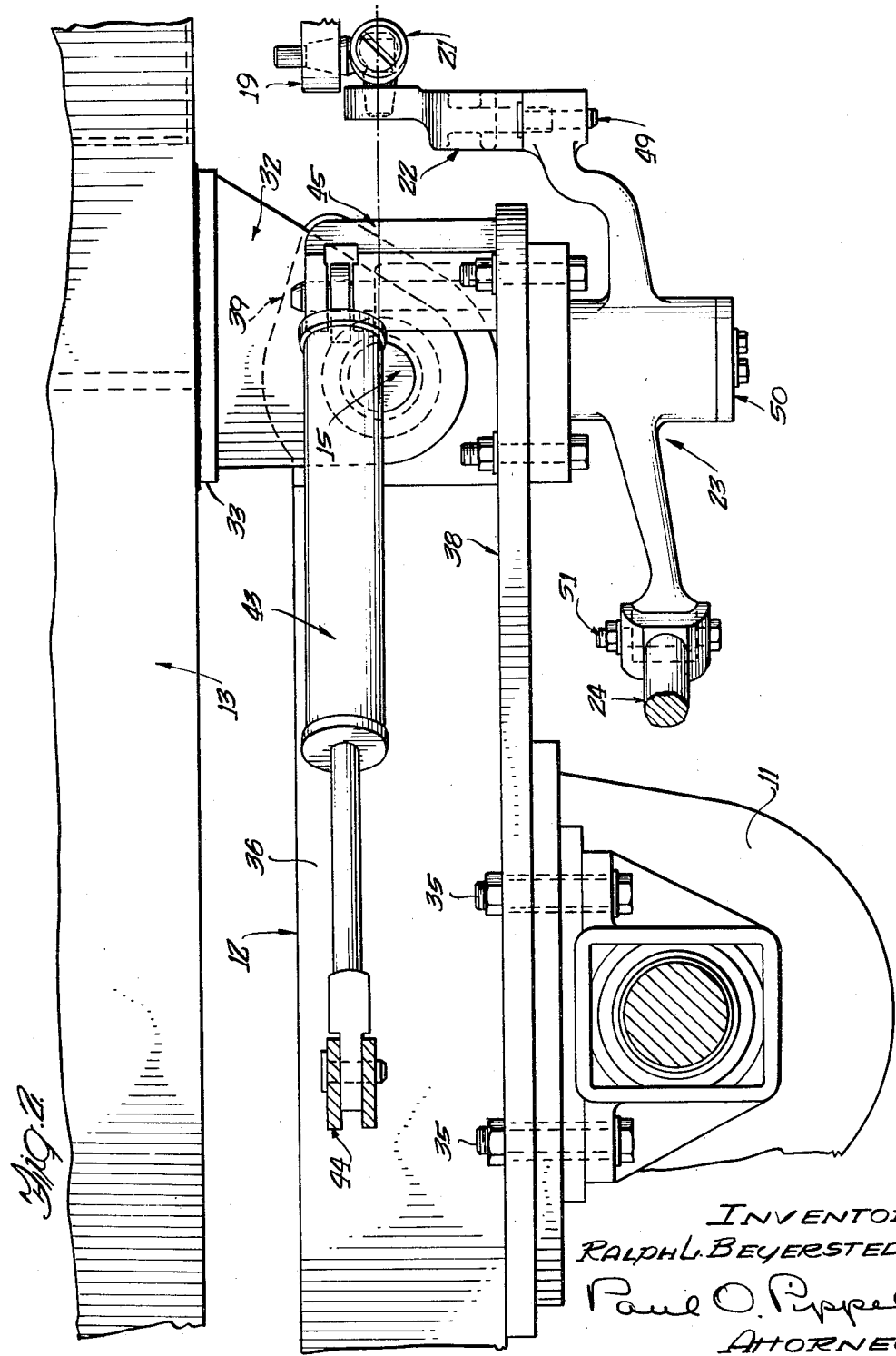
FIGURE 2 is an enlarged cross-sectional view of a portion of the structure shown in FIGURE 1 and taken along the line 2—2 of FIGURE 1.
Figure 3:
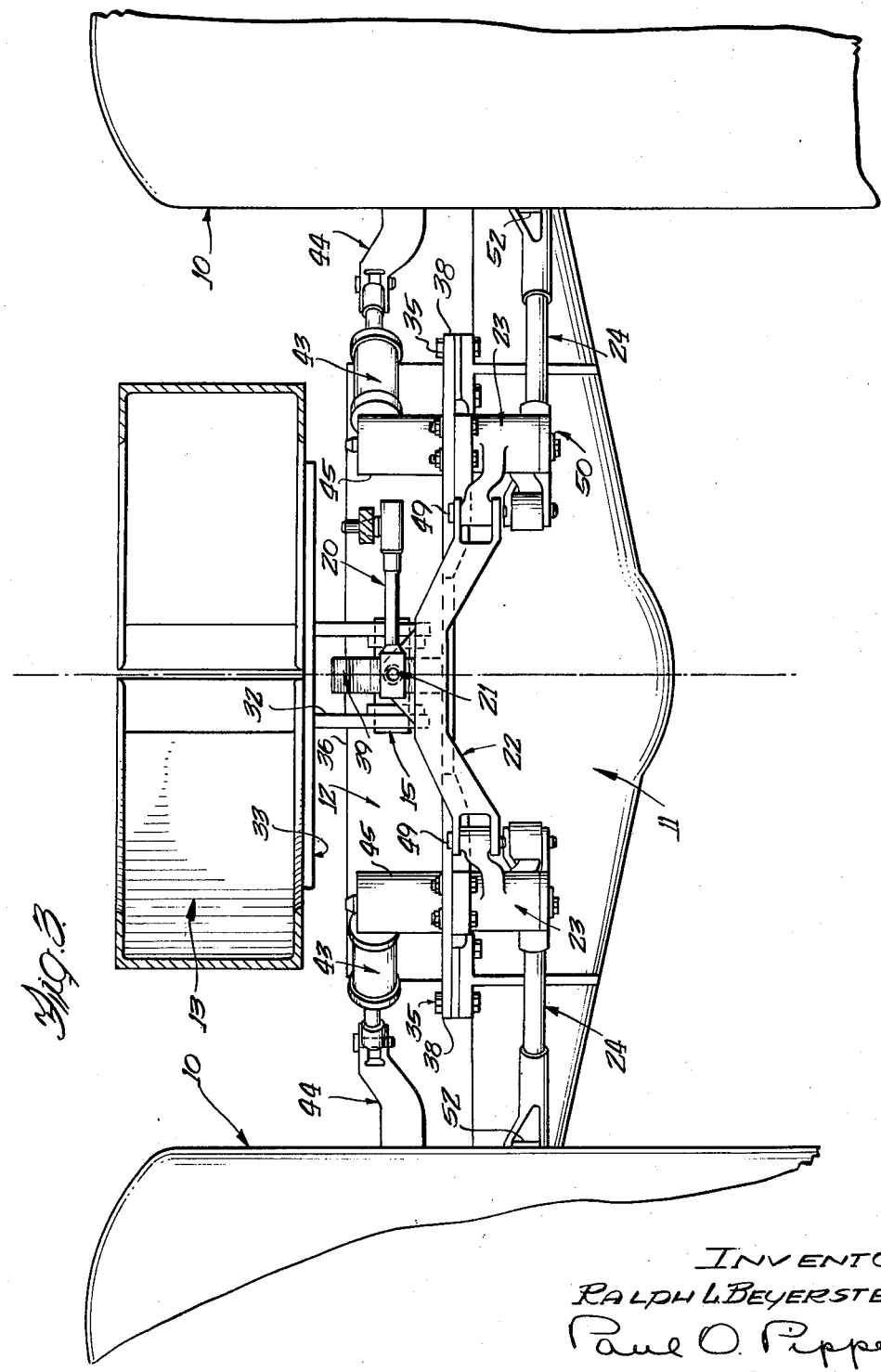
FIGURE 3 is an enlarged view of a portion of the structure shown in FIGURE 1 and taken along the line 3—3 of FIGURE 1.

For a general description of the present invention reference is made to the drawings. The wheels 10 are steeringly mounted at each end of a rigid axle assembly 11. The axle assembly 11 is bolted to a somewhat diamond-shaped carrier 12. The carrier 12 is positioned beneath the frame 13 of the tractor and is pivotally connected thereto by pins 14 and 15. It can be seen in FIGURE 1 that the body 13 narrows toward the rear end wherein it substantially defines a single box beam section overlying the carrier 12. This arrangement permits the wheels 10, axle assembly 11 and carrier 12 to oscillate about a longitudinal center line of the tractor, which line is the axis of pin 14 and intersects pin 15. The present embodiment contemplates power assist mechanism to the mechanical steering arrangement for steering the wheels 10 relative to the axle assembly 11, however it is believed that a description of the power steering assist mechanism is not necessary since it is controlled by the mechanical steering system, and it is the mechanical steering system to which the present invention is primarily directed. The mechanical steering system may briefly be described beginning with the steering wheel 16 which is operatively connected to gearing means 17, which in turn moves a link 18 responsive to the rotations of the steering wheel 16. The link 18 is connected to a bellcrank 19 which in turn is connected to a link 20 which in turn is provided with a ball joint 21. The ball joint 21 is secured to a link 22 substantially at the longitudinal center thereof. Each end of the link 22 is pivotally connected to one end of a lever 23 and the other end of each of the levers 23 is connected to a link 24 which in turn is pivotally connected to the steering arm 25 on each wheel. The arrangement of the various links and levers is such that the ball joint 21 lies on a longitudinal center line and the axis through the pins 14 and 15 when the wheels 10 are in the straight ahead position such as shown in FIGURE 1. With this arrangement, and with the wheels in the straight ahead position such as shown in FIGURE 1, the axle assembly 11 and carrier 12 may oscillate about the longitudinal center line and axis through pins 14 and 15 without changing the mechanical steering geometry. Thus no wavering of the vehicle will occur as the vehicle travels in the straight ahead direction and as the wheels encounter bumps or obstructions which cause the axle assembly 11 and carrier 12 to oscillate about the noted axis relative to the frame of the tractor.

For a detailed description of the present invention continued reference is made to the drawings. The front end of the tractor is not shown, it being sufficient for the purposes of this invention that it be understood that the forward end of the tractor comprises a pair of front wheels which are connected to the forward end of the frame 13 so that the frame 13 will oscillate with the front wheels as the tractor is moved over the ground. The rearward end of the frame 13 which terminates in a somewhat box beam section 30 extends over the carrier 12 and is provided with two pairs of depending flanges, flanges 31 depending from the rearward end of the box beam section 30 and flanges 32 depending from the frame 13 at a position spaced forwardly of the rearward end of the tractor. Flanges 31 are positioned in a spaced-apart relationship to each other along the longitudinal center line of the frame 13, and flanges 32 are positioned in a spaced-apart relationship transversely of the frame 13 an equally spaced distance on each side of the longitudinal center line of the frame 13. The flanges 32 are secured to a plate 33 which is secured to the underside of the frame 13.

The wheels 10 are carried on suitable hubs 34 which are in turn suitably connected to the axle assembly 11 by suitable kingpin arrangements (not shown). The axle assembly rigidly extends between the kingpin arrangement at each hub 34 and is secured to the underside of the axle carrier 12 by bolts 35. The carrier 12 comprises side walls 36, a rear wall 37, a pair of mounting plates 38, a front pin-mounting plate 39 and a reinforcing plate 40. Each of the side walls 36 are formed in a somewhat V-shape and one end of each side wall 36 is connected to one side of the rear wall 37. The other end of each side wall 36 is secured to the front pin-mounting plate 39, and that plate is disposed in a vertical plane and extends forwardly of the carrier 12. The reinforcing plate 40 is secured to the rearward end of the front pin-mounting plate 39 and the side walls 36 to strengthen the carrier 12. The mounting plates 38 are secured to the underside of the side walls 36 on each side of the carrier 12 and form a portion of the carrier which is secured by bolts 35 to the axle assembly 11. The rear wall 37 which is disposed substantially vertically and transversely of the tractor is positioned between the depending flanges 31 of the box section 30 of the frame 13 and is pivotally connected thereto by the pin 14 which is journaled therethrough. The pin 14 is disposed on a longitudinal center line of the tractor. The front pin-mounting plate 39 extends longitudinally of the tractor along the longitudinal center line thereof and is positioned between the depending flanges 32 on the frame 13. The front pin-mounting plate 39 carries the outer race of a spherical bearing, the inner race of which is mounted on the pin 15 and the pin 15 is secured to the flanges 32. The pin 15 is positioned transversely of the tractor and intersects the axis of pin 14, that axis being disposed substantially on a horizontal longitudinal center line of the tractor. The described pin arrangement permits the axle assembly 11 and the carrier 12 to oscillate through a substantial angle about the axis of pin 14.

The power assist elements for the steering of the subject tractor comprises a pair of hydraulic cylinders 43. The rod end of each of the hydraulic cylinders 43 is pivotally connected to the steering arms 44 of the hub 34 of each wheel 10. The head end of each hydraulic cylinder 43 is pivotally connected to a bracket 45 which in turn is bolted to the upper side of the plate 38. It is understood that suitable hydraulic fluid conduits, pump, reservoir and valve means (not shown) are provided for operation of the hydraulic cylinders 43 in cooperation with the operation of the mechanical steering system.

The mechanical steering system of the present invention comprises the steering wheel 16 carried in the operator's compartment of the tractor which in turn is connected to gearing means 17. Gearing means 17 is connected to one end of a link 18. The link 18 extends toward the rear of the tractor and at the other end thereof is pivotally connected at 47 to one leg of a bellcrank 19. The bellcrank 19 is pivotally mounted on pin means 48 which is fixedly carried by the tractor frame. The other leg of the bellcrank 19 is pivotally connected to one end of a link 20. The other end of the link 20 carries the socket portion of a ball joint 21, and the ball portion of the ball joint 21 is connected to a link 22 substantially at the longitudinal center thereof. Each end of the link 22 is pivotally connected by pin means 49 to one end of a lever 23. Each of the levers 23 is pivotally carried substantially at the center thereof on the underside of one of the plates 38 by pin means 50. The other end of each of the levers 23 is pivotally connected at pin means 51 to one end of a link 24. The other end of each of the links 24 is pivotally connected at 52 to the steering arm 25 on one of the hubs 34 of the wheels 10. The various described links and levers of the mechanical steering system are so formed and positioned that the ball portion of the ball joint 21 lies on the previously described axis of pin 14 when the wheels 10 are positioned for movement of the tractor in the straight ahead direction.

It should be noted in explanation of the operation of the present invention that the members extending from the link 20 to the steering wheel 16 are carried by the frame 13 or body of the tractor while the members extending from the ball joint 21 to the links 24 are carried by the axle carrier 12. As previously described, the axle assembly 11 and axle carrier 12 may oscillate relative to the frame 13 about the axis of pin 14. This relative movement of the axle assembly 11 and axle carrier 12 will not affect the mechanical steering system to cause any undesirable wavering of the wheels 10 in the straight ahead position of the tractor since such relative movement of the axle carrier 12 relative to the frame 13 will merely result in a rotation of the ball portion within the socket portion of the ball joint 21. The operation of the mechanical steering system may be briefly described as follows: rotations of the steering wheel 16 result in a rearward or forward translation of the link 18 which pivots the bellcrank 19, which in turn moves the link 20 transversely of the tractor which in turn moves the link 22 transversely of the tractor which in turn pivots both of the levers 23 about pivotal mounting means 50, to in turn move links 24 which in turn pivot the wheels 10 about their kingpin assemblies.

Having described the invention, what is considered new and desired to be protected by Letters Patent is:

1. In a mechanical steering system for a tractor with the tractor having a rigid axle assembly connected to the frame of said tractor for oscillation of said rigid axle assembly relative to said frame of said tractor about a longitudinally center line of said frame and having steerable wheels at each end of said axle assembly comprising, a pair of links, means pivotally connecting one end of each of said pair of links to one of said wheels, a pair of levers, means pivotally mounting each of said levers substantially intermediate the ends thereof on said axle assembly, means pivotally connecting one end of each of said levers to the other end of one of said links, a third link, means pivotally connecting said third link at each end thereof to the other end of each of said levers, said pair of links, said pair of levers and said third link being formed to position said third link substantially transversely of the axis of oscillation of said axle assembly relative to said frame of said tractor and so that said wheels are steered responsive to movements of said third link along the longitudinal axis thereof, a steering wheel carried on said frame of said tractor, means pivotally connecting said steering wheel to the longitudinal center of said third link for steering movement of said wheels responsive to movement of said steering wheel, said last-mentioned means being formed to maintain said third link against any longitudinal movement when said axle assembly oscillates relative to said frame of said tractor and the wheels of said tractor are aligned in the straight ahead driving position.

2. In a mechanical steering system for a tractor with the tractor having a rigid axle assembly connected to the frame of said tractor for oscillation of said rigid axle assembly relative to said frame of said tractor about a longitudinal center line of said frame and having steerable wheels at each end of said axle assembly comprising, a pair of links, means pivotally connecting one end of each of said pair of links to one of said wheels, a pair of levers, means pivotally mounting each of said levers substantially intermediate the ends thereof on said axle assembly, means pivotally connecting one end of each of said levers to the other end of one of said links, a third link, means pivotally connecting said third link at each end thereof to the other end of each of said levers, said pair of links, said pair of levers, and said third link being formed to position said third link substantially transversely of the axis of oscillation of said axle assembly relative to said frame of said tractor and so that said wheels are steered responsive to movements of said third link along the longitudinal axis thereof, a steering wheel carried on said frame of said tractor, a ball joint, means carrying said ball joint on said third link substantially at the longitudinal center thereof and on the axis of ocillation of said axle assembly relative to the frame of said tractor when said wheels are aligned in the straight ahead driving position, and means connected between said steering wheel and said ball joint for moving said third link along the longitudinal axis thereof responsive to movement of said steering wheel.

3. In a mechanical steering system for a tractor with the tractor having a rigid axle assembly connected to the frame of said tractor for oscillation of said rigid axle assembly relative to said frame of said tractor about a longitudinal center line of said frame and having steerable wheels at each end of said axle assembly comprising a pair of links, means pivotally connecting one end of each of said pairs of links to one of said wheels, a pair of levers, means pivotally mounting each of said levers substantially intermediate the ends thereof on said axle assembly, means pivotally connecting one end of each of said levers to the other end of one of said links, a third link, means pivotally connecting said third link at each end thereof to the other end of each of said levers, said pair of links, said pair of levers, and said third link being formed to position said third link substantially transversely of the axis of oscillation of said axle assembly relative to said frame of said tractor and so that said wheels are steered responsive to movements of said third ling along the longitudinal axis thereof, a bellcrank pivotally carried by said frame, a fourth link pivotally connected at one thereof to one leg of said bellcrank, a ball joint mounted on the other end of said fourth link, means connecting said ball joint to said third link substantially at the longitudinal center thereof and on the axis of oscillation of said axle assembly relative to said frame of said tractor when the wheels of said tractor are aligned in the straight ahead driving position, said bellcrank and said fourth link being formed and positioned to move said third link along the longitudinal axis thereof responsive to pivotal movements of said bellcrank, and steering wheel means pivotally connected to the other leg of said bellcrank for pivoting said bellcrank for steering movement of said wheels.

References Cited in the file of this patent

UNITED STATES PATENTS

| | | |
|---|---|---|
| 1,278,650 | Hewitt | Sept. 10, 1918 |
| 1,476,447 | Holle | Dec. 4, 1923 |
| 1,677,419 | Wagner | July 17, 1928 |
| 1,826,113 | Winsor | Oct. 6, 1931 |
| 2,948,546 | Fabere et al. | Aug. 9, 1960 |

FOREIGN PATENTS

| | | |
|---|---|---|
| 483,195 | Great Britain | Apr. 13, 1938 |